(12) United States Patent
Rigney et al.

(10) Patent No.: US 8,634,283 B1
(45) Date of Patent: Jan. 21, 2014

(54) DISK DRIVE PERFORMING IN-DRIVE SPIRAL TRACK WRITING

(75) Inventors: Brian P. Rigney, Louisville, CO (US);
Edgar D. Sheh, San Jose, CA (US);
Charles A. Park, Aromas, CA (US);
Scott A. Ottele, Longmont, CO (US);
Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 66 days.

(21) Appl. No.: 13/205,034

(22) Filed: Aug. 8, 2011

(51) Int. Cl.
*G11B 7/00* (2006.01)
*G11B 21/02* (2006.01)

(52) U.S. Cl.
USPC .................. 369/44.28; 369/30.17; 360/75

(58) Field of Classification Search
USPC ............. 369/111, 44.13, 44.26, 275.4, 44.11,
369/44.28, 44.31, 30.1, 30.12, 30.17, 47.49,
369/275.3; 360/75, 77.07, 77.04, 77.11, 69
See application file for complete search history.

(56) References Cited

U.S. PATENT DOCUMENTS

| | | | |
|---|---|---|---|
| 5,459,623 A | 10/1995 | Blagaila et al. | |
| 5,657,179 A | 8/1997 | McKenzie | |
| 5,668,679 A | 9/1997 | Swearingen et al. | |
| 5,696,647 A | 12/1997 | Phan et al. | |
| 5,754,352 A | 5/1998 | Behrens et al. | |
| 6,005,727 A | 12/1999 | Behrens et al. | |
| 6,021,012 A | 2/2000 | Bang | |
| 6,091,564 A | 7/2000 | Codilian et al. | |
| 6,191,906 B1 | 2/2001 | Buch | |
| 6,292,318 B1 | 9/2001 | Hayashi | |
| 6,304,407 B1 | 10/2001 | Baker et al. | |
| 6,411,453 B1 | 6/2002 | Chainer et al. | |
| 6,507,450 B1 | 1/2003 | Elliott | |
| 6,519,107 B1 | 2/2003 | Ehrlich et al. | |
| 6,587,293 B1 | 7/2003 | Ding et al. | |
| 6,704,156 B1 | 3/2004 | Baker et al. | |
| 6,738,205 B1 | 5/2004 | Moran et al. | |
| 6,920,004 B1 | 7/2005 | Codilian et al. | |
| 6,924,960 B1 | 8/2005 | Melkote et al. | |
| 6,937,420 B1 | 8/2005 | McNab et al. | |
| 6,943,978 B1 | 9/2005 | Lee | |
| 6,967,799 B1 | 11/2005 | Lee | |
| 6,970,320 B2 | 11/2005 | Sugiyama et al. | |
| 6,977,789 B1 | 12/2005 | Cloke | |
| 6,977,794 B1 | 12/2005 | Sun et al. | |
| 6,985,316 B1 | 1/2006 | Liikanen et al. | |
| 6,987,636 B1 | 1/2006 | Chue et al. | |
| 6,989,954 B1 | 1/2006 | Lee et al. | |
| 6,992,848 B1 | 1/2006 | Agarwal et al. | |
| 6,992,852 B1 | 1/2006 | Ying et al. | |
| 7,002,761 B1 | 2/2006 | Sutardja et al. | |

(Continued)

OTHER PUBLICATIONS

Office Action dated May 22, 2013 from U.S. Appl. No. 13/205,072, 21 pages.

(Continued)

*Primary Examiner* — Thang Tran

(57) ABSTRACT

A disk drive is disclosed comprising a head actuated over a disk, wherein a bootstrap spiral track is written on the disk. While servoing on the bootstrap spiral track at least one circular reference track is written on the disk. A velocity profile is adjusted in response to the circular reference track, and a plurality of spiral tracks are written to the disk in response to the velocity profile.

16 Claims, 17 Drawing Sheets

(56) References Cited

U.S. PATENT DOCUMENTS

| | | | |
|---|---|---|---|
| 7,019,937 B1 | 3/2006 | Liikanen et al. | |
| 7,088,533 B1 | 8/2006 | Shepherd et al. | |
| 7,136,253 B1 | 11/2006 | Liikanen et al. | |
| 7,145,744 B1 | 12/2006 | Clawson et al. | |
| 7,193,797 B1 * | 3/2007 | Sun et al. | 360/31 |
| 7,209,312 B1 | 4/2007 | Sutardja | |
| 7,212,364 B1 | 5/2007 | Lee | |
| 7,230,786 B1 | 6/2007 | Ray et al. | |
| 7,248,426 B1 | 7/2007 | Weerasooriya et al. | |
| 7,256,956 B2 | 8/2007 | Ehrlich | |
| 7,333,280 B1 | 2/2008 | Lifchits et al. | |
| 7,333,286 B2 | 2/2008 | Jung et al. | |
| 7,375,918 B1 | 5/2008 | Shepherd et al. | |
| 7,382,564 B1 | 6/2008 | Everett et al. | |
| 7,391,583 B1 | 6/2008 | Sheh et al. | |
| 7,391,584 B1 | 6/2008 | Sheh et al. | |
| 7,405,897 B2 | 7/2008 | Dougherty et al. | |
| 7,411,758 B1 | 8/2008 | Cheung et al. | |
| 7,414,809 B2 | 8/2008 | Smith et al. | |
| 7,471,482 B2 | 12/2008 | Rutherford | |
| 7,477,468 B2 | 1/2009 | Aoki et al. | |
| 7,495,857 B1 | 2/2009 | Bennett | |
| 7,502,195 B1 * | 3/2009 | Wu et al. | 360/75 |
| 7,505,223 B1 * | 3/2009 | McCornack | 360/75 |
| 7,522,370 B1 | 4/2009 | Sutardja | |
| 7,529,055 B1 | 5/2009 | Laks et al. | |
| 7,529,162 B2 | 5/2009 | Muzio et al. | |
| 7,551,387 B2 | 6/2009 | Sun et al. | |
| 7,561,361 B1 | 7/2009 | Rutherford | |
| 7,619,846 B2 | 11/2009 | Shepherd et al. | |
| 7,623,313 B1 | 11/2009 | Liikanen et al. | |
| 7,639,445 B2 | 12/2009 | Matsunaga et al. | |
| 7,639,446 B2 | 12/2009 | Mizukoshi et al. | |
| 7,656,604 B1 | 2/2010 | Liang et al. | |
| 7,675,705 B2 | 3/2010 | Mizukoshi et al. | |
| 7,688,534 B1 | 3/2010 | McCornack | |
| 7,715,143 B2 | 5/2010 | Bliss et al. | |
| 7,728,539 B2 | 6/2010 | Smith et al. | |
| 7,733,588 B1 | 6/2010 | Ying | |
| 7,737,793 B1 | 6/2010 | Ying et al. | |
| 7,751,144 B1 | 7/2010 | Sutardja | |
| 7,773,335 B1 | 8/2010 | Adler et al. | |
| 7,839,591 B1 | 11/2010 | Weerasooriya et al. | |
| 7,843,662 B1 * | 11/2010 | Weerasooriya et al. | 360/78.14 |
| 7,852,592 B1 | 12/2010 | Liang et al. | |
| 7,852,598 B1 | 12/2010 | Sutardja | |
| 7,855,850 B2 | 12/2010 | Matsunaga et al. | |
| 7,864,481 B1 * | 1/2011 | Kon et al. | 360/75 |
| 7,881,004 B2 | 2/2011 | Kumbla et al. | |
| 7,881,005 B1 | 2/2011 | Cheung et al. | |
| 8,031,428 B1 | 10/2011 | Rutherford | |
| 8,077,422 B1 * | 12/2011 | Ton-That et al. | 360/75 |
| 8,184,393 B1 | 5/2012 | Sutardja | |
| 8,194,343 B1 | 6/2012 | Adler et al. | |
| 8,315,005 B1 | 11/2012 | Zou et al. | |
| 2003/0189784 A1 | 10/2003 | Galloway | |
| 2005/0007688 A1 | 1/2005 | Chang et al. | |
| 2006/0171058 A1 * | 8/2006 | Chan et al. | 360/75 |
| 2006/0171059 A1 | 8/2006 | Chan et al. | |
| 2006/0221490 A1 | 10/2006 | Tan et al. | |
| 2007/0070538 A1 | 3/2007 | Lau et al. | |
| 2007/0076314 A1 | 4/2007 | Rigney | |
| 2007/0081268 A1 * | 4/2007 | Jung et al. | 360/73.01 |
| 2007/0211367 A1 | 9/2007 | Lau et al. | |
| 2007/0211369 A1 * | 9/2007 | Yang et al. | 360/75 |
| 2007/0291401 A1 | 12/2007 | Sun et al. | |
| 2009/0086357 A1 | 4/2009 | Ehrlich | |
| 2010/0085654 A1 | 4/2010 | Yu et al. | |
| 2010/0318825 A1 | 12/2010 | Fulkerson et al. | |

OTHER PUBLICATIONS

Notice of Allowance dated Jun. 10, 2013 from U.S. Appl. No. 13/204,918, 27 pages.

* cited by examiner

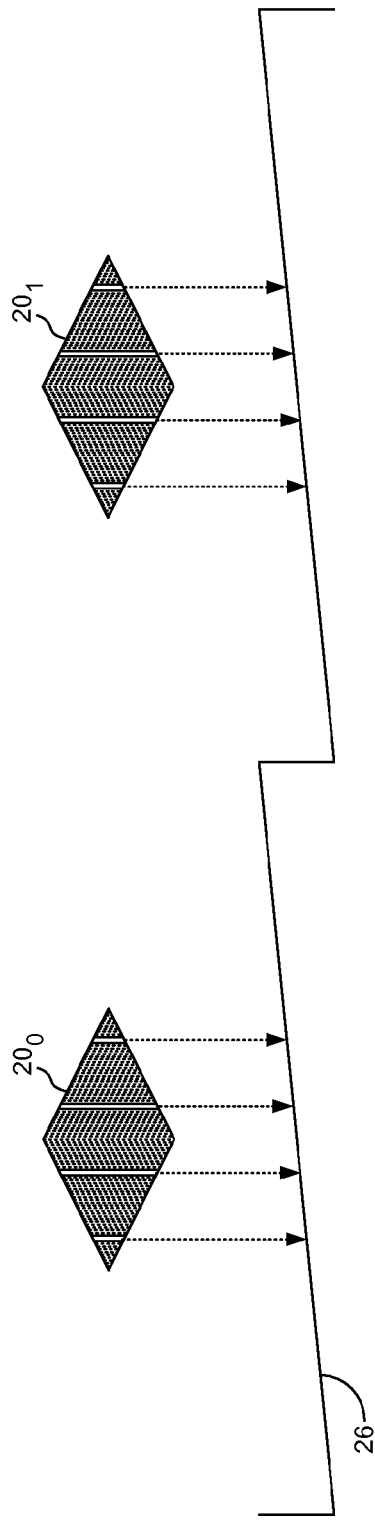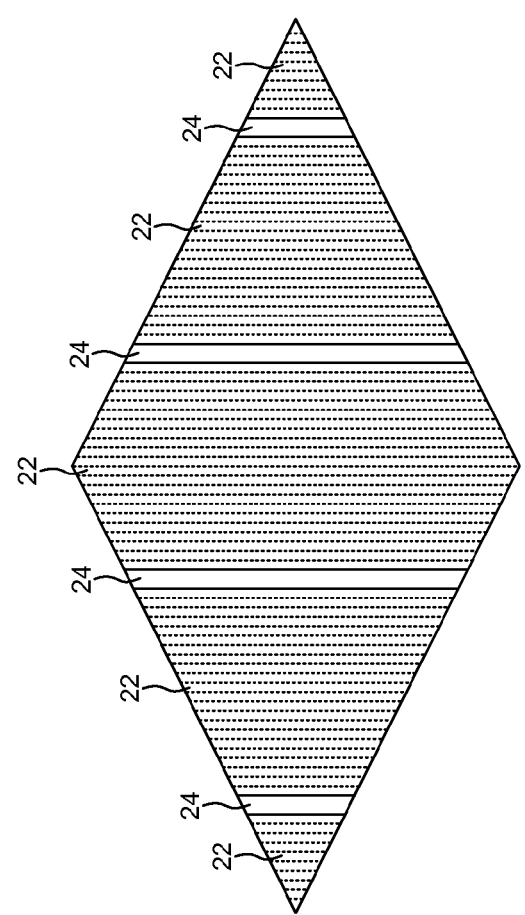
FIG. 3A
FIG. 3B

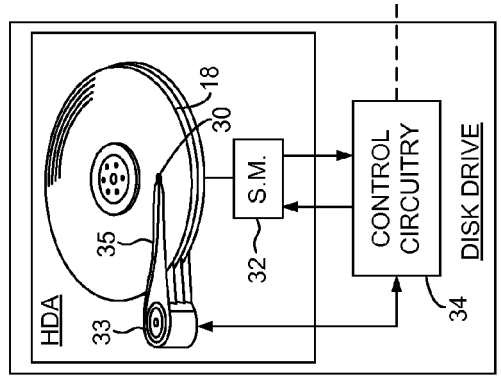
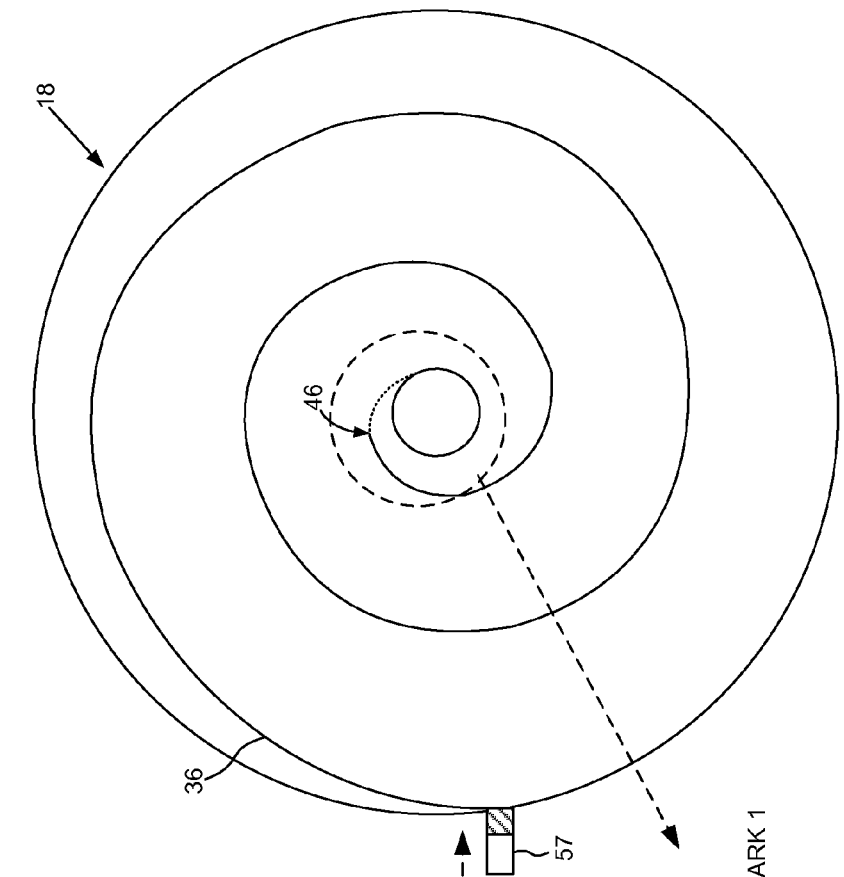
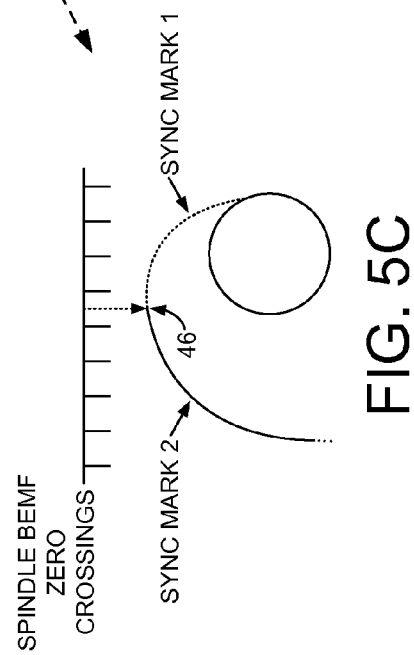

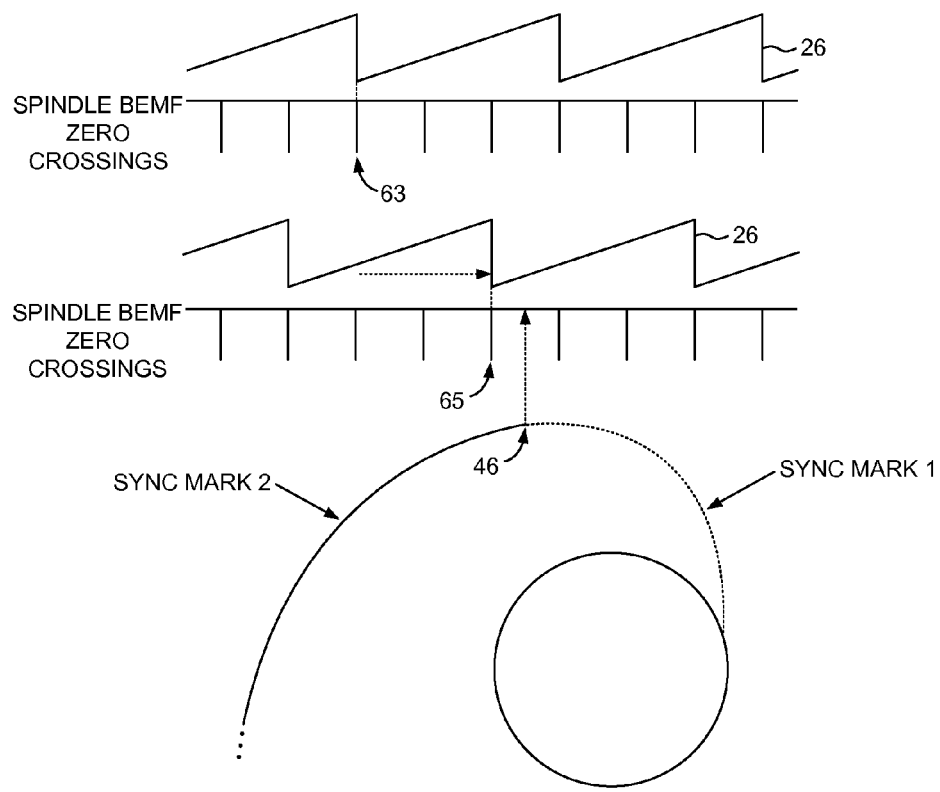

DISK DRIVE PERFORMING IN-DRIVE SPIRAL TRACK WRITING

BACKGROUND

When manufacturing a disk drive, concentric servo sectors $2_0$-$2_N$ are written to a disk 4 which define a plurality of radially-spaced, concentric servo tracks 6 as shown in the prior art disk format of FIG. 1. A plurality of concentric data tracks are defined relative to the servo tracks 6, wherein the data tracks may have the same or a different radial density (tracks per inch (TPI)) than the servo tracks 6. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target data track during a seek operation, and the servo bursts 14 are processed to maintain the head over a centerline of the target data track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

BRIEF DESCRIPTION OF THE DRAWINGS

FIG. 3A shows an embodiment of the present invention wherein a disk locked clock is synchronized by clocking a modulo-N counter relative to when the sync marks in the spiral tracks are detected.

FIG. 3B shows an eye pattern generated by reading the spiral track, including the sync marks in the spiral track.

FIGS. 5A-5C show an embodiment of the present invention wherein a sync mark seam is written in a bootstrap spiral track in response to a spindle BEMF voltage.

FIGS. 9A and 9B show an embodiment of the present invention wherein the disk locked clock is synchronized to the bootstrap spindle BEMF voltage, and the modulo-N counter initialized in response to detecting the sync mark seam in the bootstrap spiral track.

DETAILED DESCRIPTION OF EMBODIMENTS OF THE INVENTION

Figure 1:
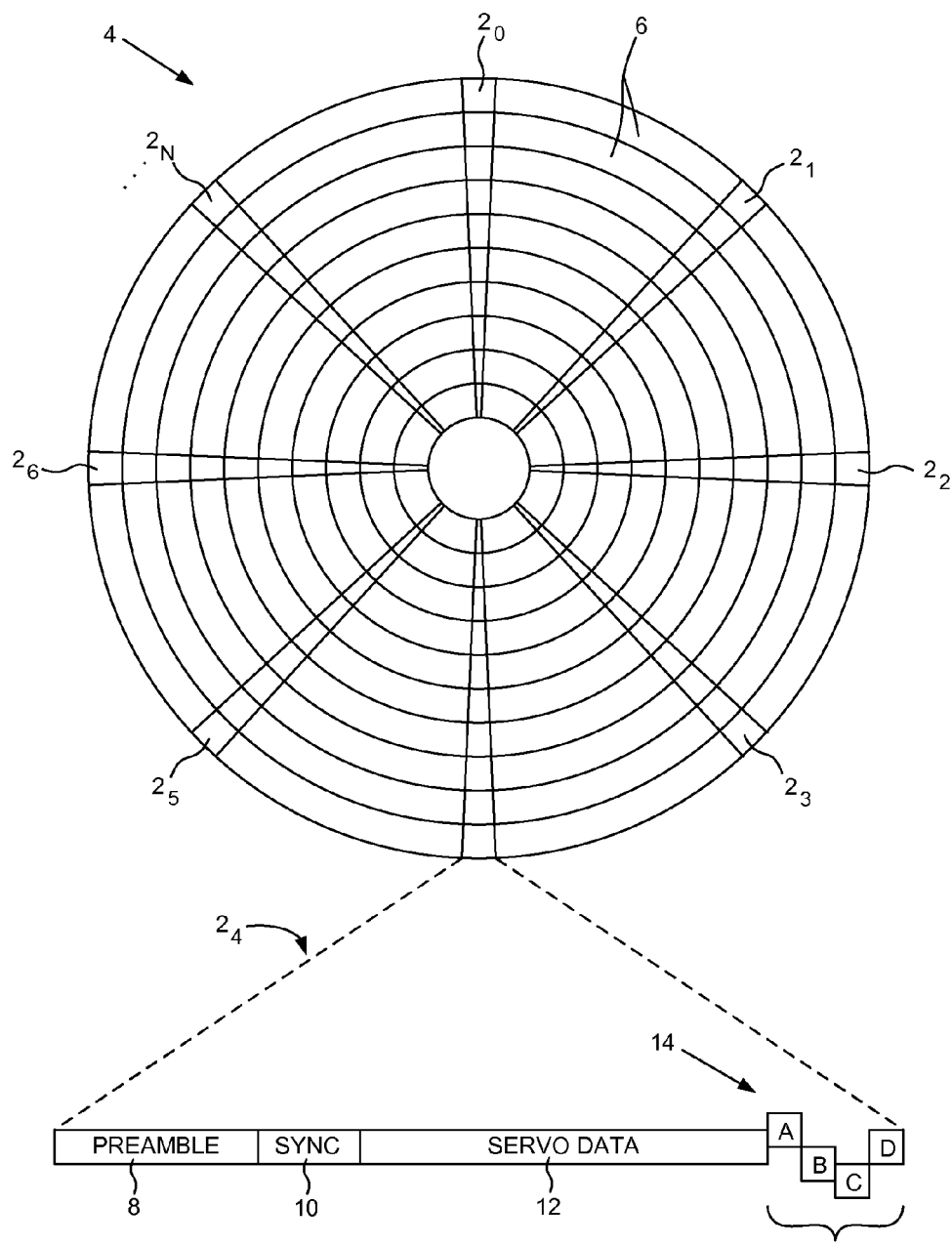
FIG. 1 shows a prior art disk format comprising a plurality of radially spaced, concentric tracks defined by a plurality of product servo sectors.
Figure 2A:
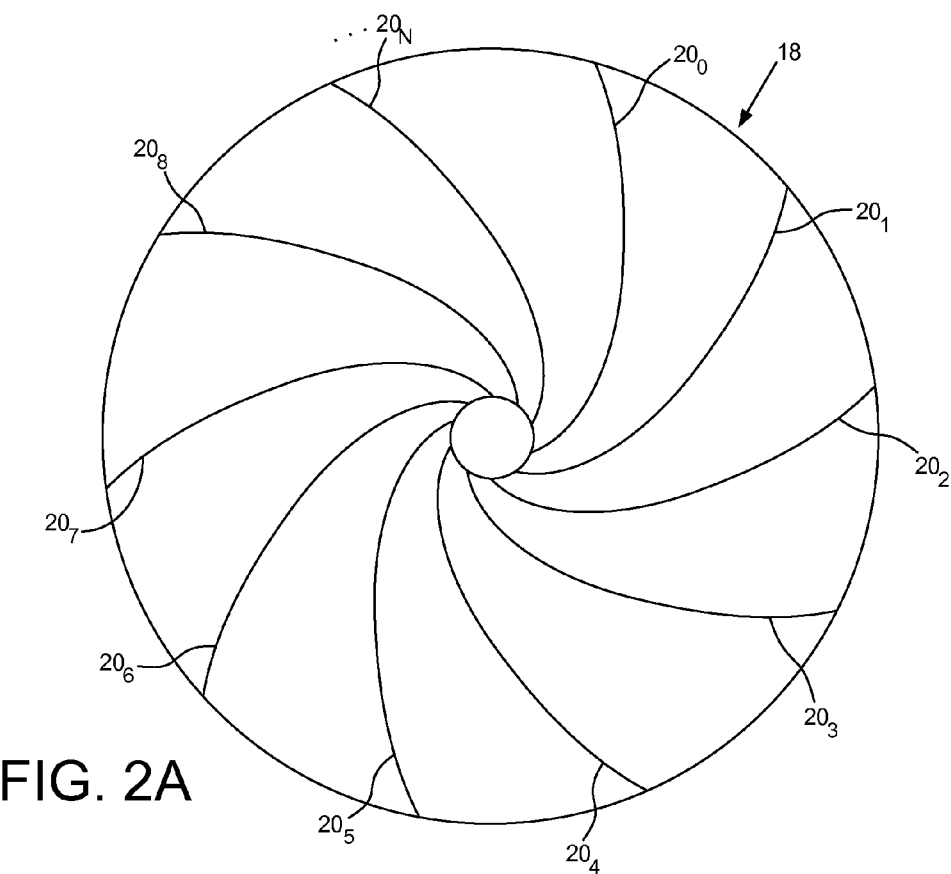
FIG. 2A illustrates an embodiment of the present invention wherein a plurality of spiral tracks are written to the disk for use in writing product servo sectors to the disk.
Figure 2B:
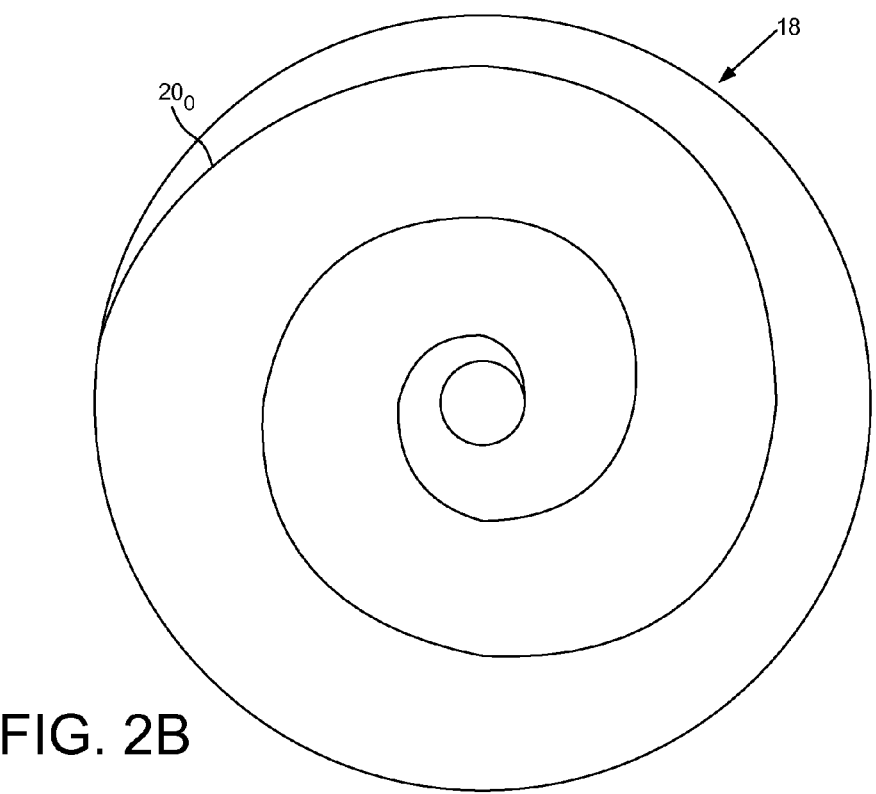
FIG. 2B illustrates an embodiment of the present invention wherein each spiral track is written over multiple revolutions of the disk.

FIG. 2A shows a disk 18 comprising a plurality of spiral tracks $20_0$-$20_N$, wherein each spiral track 20 comprises a high frequency signal 22 interrupted by sync marks 24 (FIG. 3B). Each spiral track 20 in FIG. 2A spans a fractional disk revolution; however, in other embodiments each spiral track 20 may span multiple disk revolutions as shown in FIG. 2B. As described below, in one embodiment the spiral tracks $20_0$-$20_N$ are used to servo the head over the disk 18 while writing product servo sectors that define concentric servo tracks such as shown in FIG. 1. Conventionally, the spiral tracks $20_0$-$20_N$ were written using an external spiral track writer or a media writer, and then the control circuitry internal to the disk drive used to process the spiral tracks $20_0$-$20_N$ in order to self servo write the product servo sectors that define the concentric servo tracks. In some embodiments of the present invention, the spiral tracks $20_0$-$20_N$ may be written by the control circuitry internal to each disk drive thereby obviating the bottleneck and expense of an external spiral track writer or media writer.

FIG. 3B illustrates an "eye" pattern in the read signal generated when the head crosses over a spiral track 20. The read signal representing the spiral track crossing comprises high frequency transitions 22 interrupted by sync marks 24 at a predetermined interval. When the head moves in the radial direction, the eye pattern will shift (left or right) while the sync marks 24 remain fixed (ideally). The shift in the eye pattern (detected from the high frequency signal 22) relative to the sync marks 24 provides the off-track information (spiral position error signal (PES)) for servoing the head.

FIG. 3A shows an embodiment of the present invention wherein a saw-tooth waveform 26 is generated by clocking a modulo-N counter with a disk locked clock, wherein the frequency of the disk locked clock is adjusted until the sync marks 24 in the spiral tracks $20_0$-$20_N$ are detected at a target modulo-N count value. The disk locked clock may be generated using any suitable circuitry, such as a phase locked loop (PLL). As each sync mark 24 in the spiral tracks $20_0$-$20_N$ is detected, the value of the modulo-N counter represents the phase error for adjusting the PLL.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster radially over the disk 18) which reduces the time required to write each spiral track $20_0$-$20_N$. In an embodiment described below, a bootstrap spiral track may be written to the disk using different sync marks, wherein the change in sync marks defines a sync mark seam within the bootstrap spiral track.

In one embodiment, the disk locked clock is further synchronized by generating a timing recovery measurement from the high frequency signal 22 between the sync marks 24 in the spiral tracks $20_0$-$20_N$. Synchronizing the disk locked clock to the high frequency signal 22 helps maintain proper radial alignment (phase coherency) of the Gray coded track addresses in the product servo sectors. The timing recovery measurement may be generated in any suitable manner. In one embodiment, the disk locked clock is used to sample the high frequency signal 22 and the signal sample values are processed to generate the timing recovery measurement. The timing recovery measurement adjusts the phase of the disk locked clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the disk locked clock.

Figure 4:
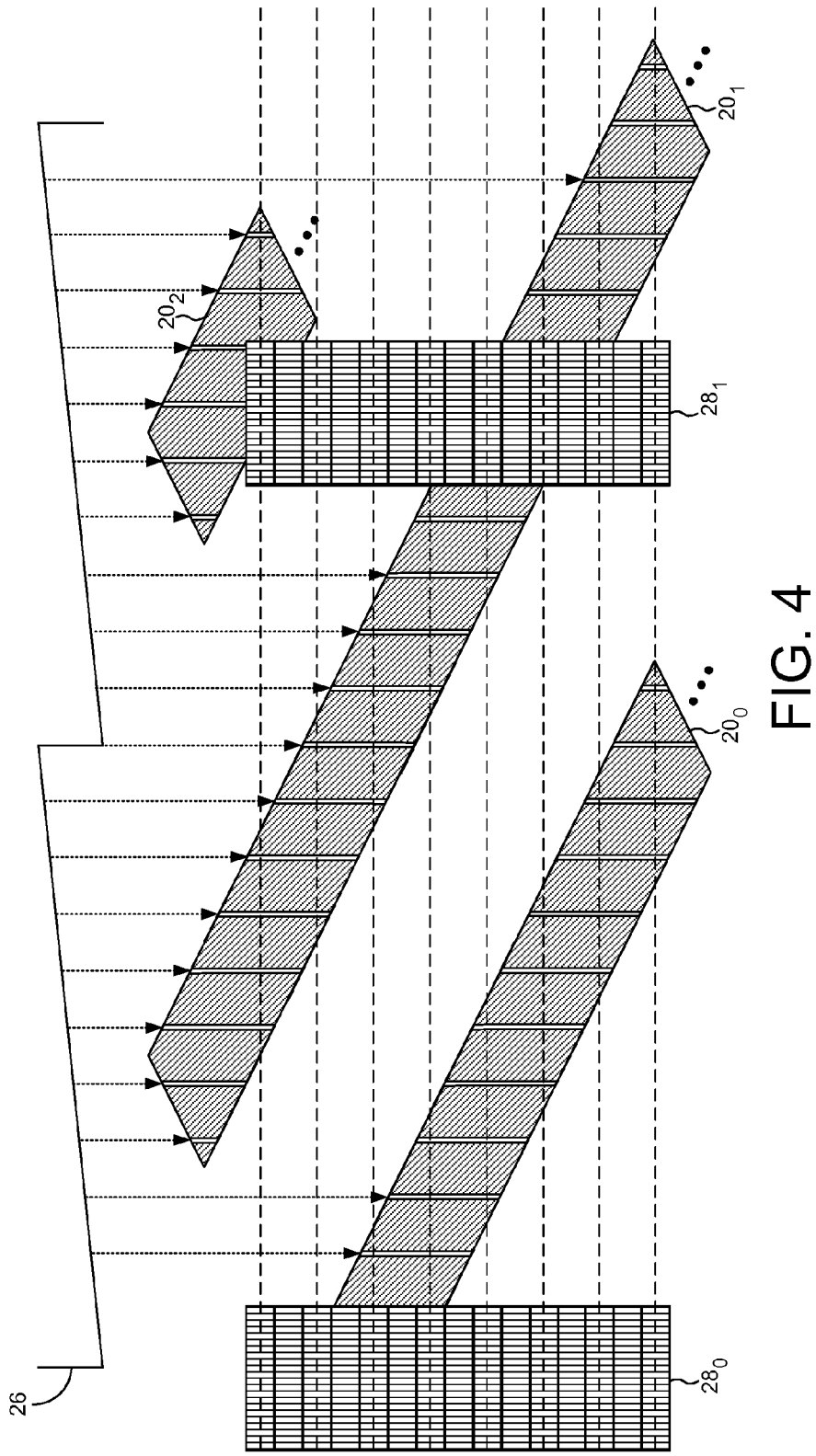
FIG. 4 illustrates writing of product servo sectors using the disk locked clock to servo on the spiral tracks.

FIG. 4 illustrates an embodiment of the present invention for writing the product servo sectors $28_0$-$28_N$ to the disk 18 after synchronizing the disk locked clock in response to at least the sync marks 24 in the spiral tracks $20_0$-$20_N$. In the embodiment of FIG. 4, the dashed lines represent the centerlines of the servo tracks. The sync marks in the spiral tracks $20_0$-$20_N$ are written so that there is a shift of two sync marks 24 in the eye pattern (FIG. 3B) between servo tracks. In an alternative embodiment, the sync marks 24 in the spiral tracks $20_0$-$20_N$ are written so that there is a shift of N sync marks in the eye pattern between servo tracks. In the embodiment of FIG. 4, each spiral track $20_0$-$20_N$ is wider than a servo track, however, in an alternative embodiment the width of each spiral track $20_0$-$20_N$ is less than or proximate the width of a servo track.

The spiral PES for maintaining the head along a servo track (tracking) while writing the product servo sectors $28_0$-$28_N$ may be generated from the spiral tracks $20_0$-$20_N$ in any suitable manner. In one embodiment, the PES is generated by detecting the eye pattern in FIG. 3B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Once the head is tracking on a servo track, the product servo sectors $28_0$-$28_N$ are written to the disk using the disk locked clock. Write circuitry is enabled when the modulo-N counter reaches a predetermined value, wherein the disk locked clock clocks the write circuitry to write the product servo sector 28 to the disk. The spiral tracks $20_0$-$20_N$ on the disk are processed in an interleaved manner to account for the product servo sectors $28_0$-$28_N$ overwriting a spiral track. For example, when writing the product servo sectors $28_1$ to the disk, spiral track $20_1$ is processed initially to generate the spiral PES tracking error and the disk locked clock timing recovery measurement. When the product servo sectors $28_1$ begin to overwrite spiral track $20_1$, spiral track $20_o$ is processed to generate the spiral PES tracking error and the disk locked clock timing recovery measurement.

Figure 6:
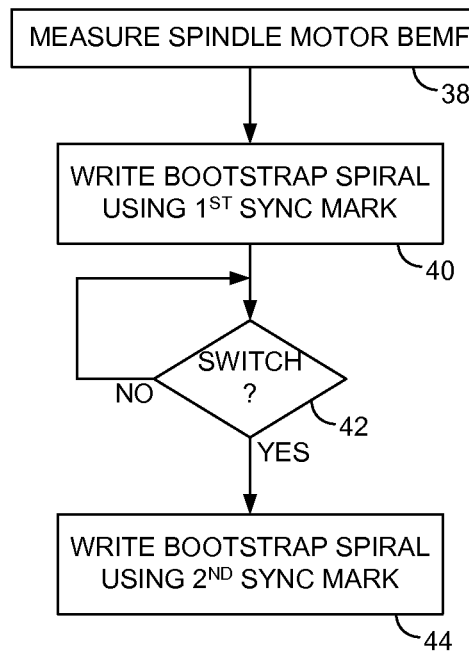
FIG. 6 is a flow diagram according to an embodiment of the present invention wherein the sync mark seam is written by switching sync marks in response to the spindle BEMF voltage.

FIG. 5A shows a disk drive according to an embodiment of the present invention comprising a head 30 actuated over a disk 18, a spindle motor 32 operable to rotate the disk 18, and control circuitry 34 operable to execute the flow diagram of FIG. 6. A bootstrap spiral track 36 is written to the disk 18 (FIG. 5B), wherein the bootstrap spiral track 36 comprises a high frequency signal interrupted by sync marks (FIG. 3B). While writing the bootstrap spiral track 36, a spindle back electromotive force (BEMF) voltage generated by the spindle motor 32 is measured (step 38), a first sync mark is written while writing a first part of the bootstrap spiral track (step 40), and a second sync mark is written while writing a second part of the bootstrap spiral track (step 44). A switch between writing the first sync mark and the second sync mark is made (step 42) in response to a spindle BEMF voltage, thereby generating a sync mark seam 46 in the bootstrap spiral track.

FIG. 5C shows an embodiment of the present invention wherein the control circuitry 34 is operable to switch between writing the first sync mark and the second sync mark in response to zero crossings in the spindle BEMF voltage. In the example of FIG. 5C, the sync mark seam 46 is written in the bootstrap spiral track 36 at a target interval (e.g., halfway) between two consecutive zero crossings in the spindle BEMF voltage. As described below, in one embodiment the sync mark seam 46 is used to synchronize to the bootstrap spiral track 36 by initializing the modulo-N counter 26 based on the spindle BEMF voltage zero crossing that occurs after detecting the sync mark seam 46.

Figure 7:
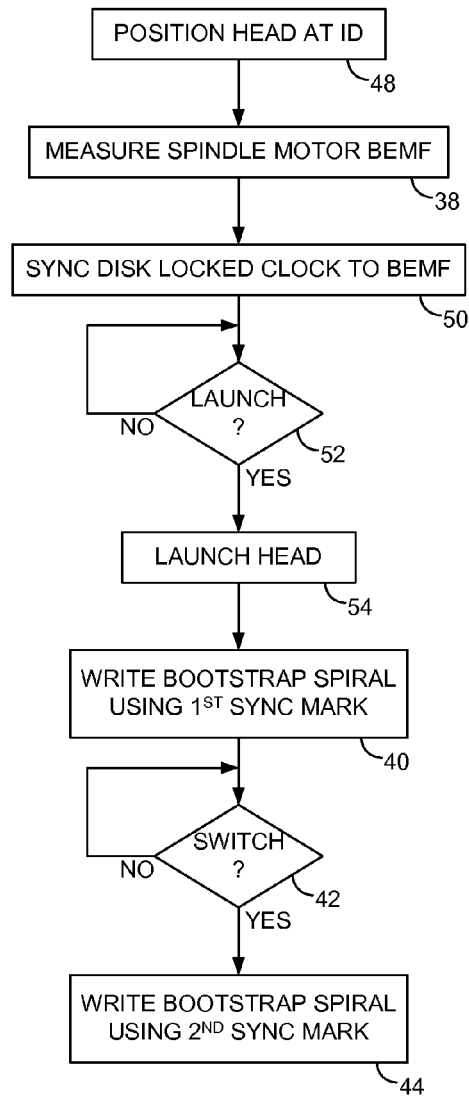
FIG. 7 is a flow diagram according to an embodiment of the present invention wherein a disk locked clock is synchronized to zero crossings in the spindle BEMF voltage and then used to write the sync mark seam in the bootstrap spiral track.

FIG. 7 is a flow diagram according to an embodiment of the present invention which extends on the flow diagram of FIG. 6, wherein the head is positioned at the inner diameter of the disk (step 48), for example, by pressing an actuator arm 35 (FIG. 5B) against an inner diameter crash stop (not shown). The spindle BEMF voltage is measured (step 38) and the disk locked clock is synchronized to the zero crossings in the spindle BEMF voltage (step 50). When the disk locked clock reaches a first value (step 52), the control circuitry launches the head toward a middle diameter of the disk (step 54). The bootstrap spiral track is written using the first sync mark (step 40) until the disk locked clock reaches a second value corresponding to the head reaching a target radial location (step 42). The bootstrap spiral track is then written using the second sync mark (44), thereby defining the sync mark seam 46 in the bootstrap spiral track.

Figure 8:
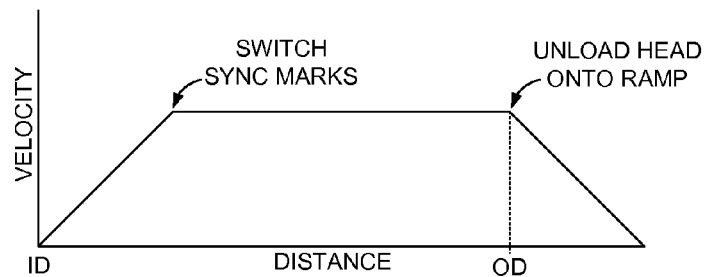
FIG. 8 shows a velocity profile according to an embodiment of the present invention wherein the bootstrap spiral track is written with a substantially constant velocity until the head contacts a ramp at an outer edge of the disk.

In one embodiment, the control circuitry accelerates the head toward the middle diameter of the disk while writing the first part of the bootstrap spiral track as illustrated by the velocity profile shown in FIG. 8. Proximate to switching between writing the first sync mark and the second sync mark, the control circuitry moves the head toward the outer diameter of the disk at a substantially constant velocity. That is, the sync mark seam 46 is written in the bootstrap spiral track proximate to the transition between an acceleration segment and a constant velocity segment as illustrated in FIG. 8.

In one embodiment, after launching the head toward the middle diameter of the disk when writing the bootstrap spiral track, the disk will rotate through a known angle before writing the sync mark seam 46, wherein the known angle corresponds to a number of cycles of the disk locked clock. Accordingly, in one embodiment the head is launched when the disk locked clock reaches a first value that is computed relative to a number of cycles before writing the sync mark seam:

$$\text{first\_value} = countsPerRev - \frac{1}{2}\frac{countsPerRev}{spindleZXPerRev} - \text{second\_value}$$

where countsPerRev represents the total number of cycles (counts) of the disk locked clock over a full revolution of the disk, spindleZXPerRev represents the number of spindle BEMF zero crossings per revolution of the disk, and the second value represents the disk rotation angle from the launch point until the sync mark seam is written. Launching the head when the disk locked clock reaches the first value computed from the above equation will cause the sync mark seam 46 to be written at an interval that is halfway between two consecutive spindle BEMF zero crossings as illustrated in FIG. 5C.

In one embodiment, the sync mark seam 46 in the bootstrap spiral track is used to resynchronize the disk locked clock, for example, after a power cycle. Synchronizing the disk locked clock to the sync mark seam 46 essentially initializes the radial and circumferential location of the head to a known state. In addition, after synchronizing the disk locked clock to the sync mark seam 46 the head may be accurately servoed radially over the disk based on the bootstrap spiral track relative to the rotational angle of the disk as determined by the disk locked clock.

Figure 10A:
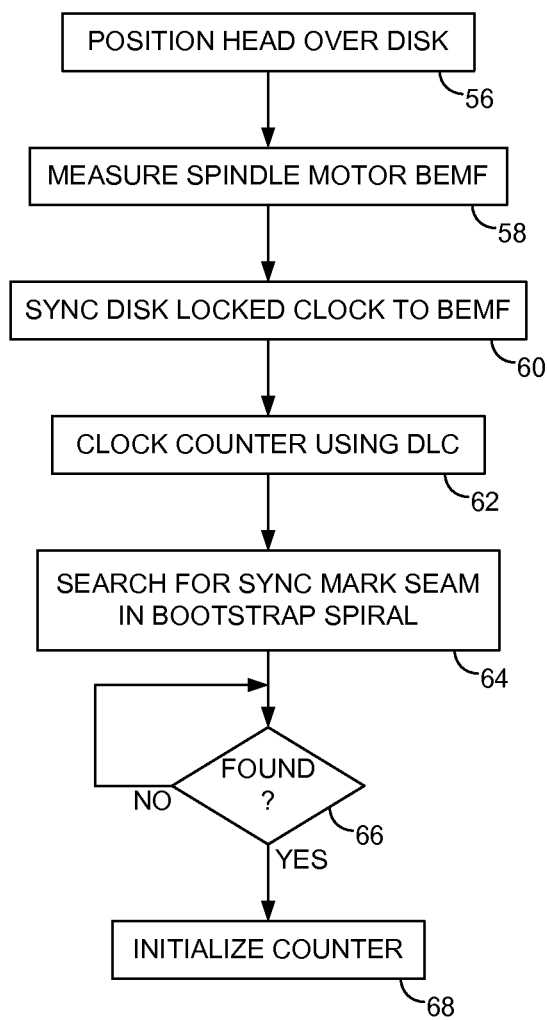
FIG. 10A is a flow diagram according to an embodiment of the present invention for initializing the modulo-N counter in response to detecting the sync mark seam in the bootstrap spiral track.

FIGS. 9A and 9B illustrate an embodiment of the present invention for resynchronizing the disk locked clock to the sync mark seam 46 as is understood with reference to the flow diagram of FIG. 10A. The head is positioned over the disk (step 56), for example, by loading the head off a ramp 57 (FIG. 5B). The spindle BEMF voltage is measured (step 58) and the disk locked clock synchronized to the zero crossings in the spindle BEMF voltage (step 60). The disk locked clock is used to clock the modulo-N counter 26 (step 62) such that the counter wraps at an arbitrary zero crossing 63 (FIG. 9A). The head is then moved radially over the disk in order to search for the sync mark seam (step 64). When the sync mark seam is found (step 66), the modulo-N counter is initialized (step 68). For example, in one embodiment the modulo-N counter is initialized so it wraps at the spindle BEMF zero crossing 65 that follows the detection of the sync mark seam as illustrated in FIG. 9B.

Figure 10B:
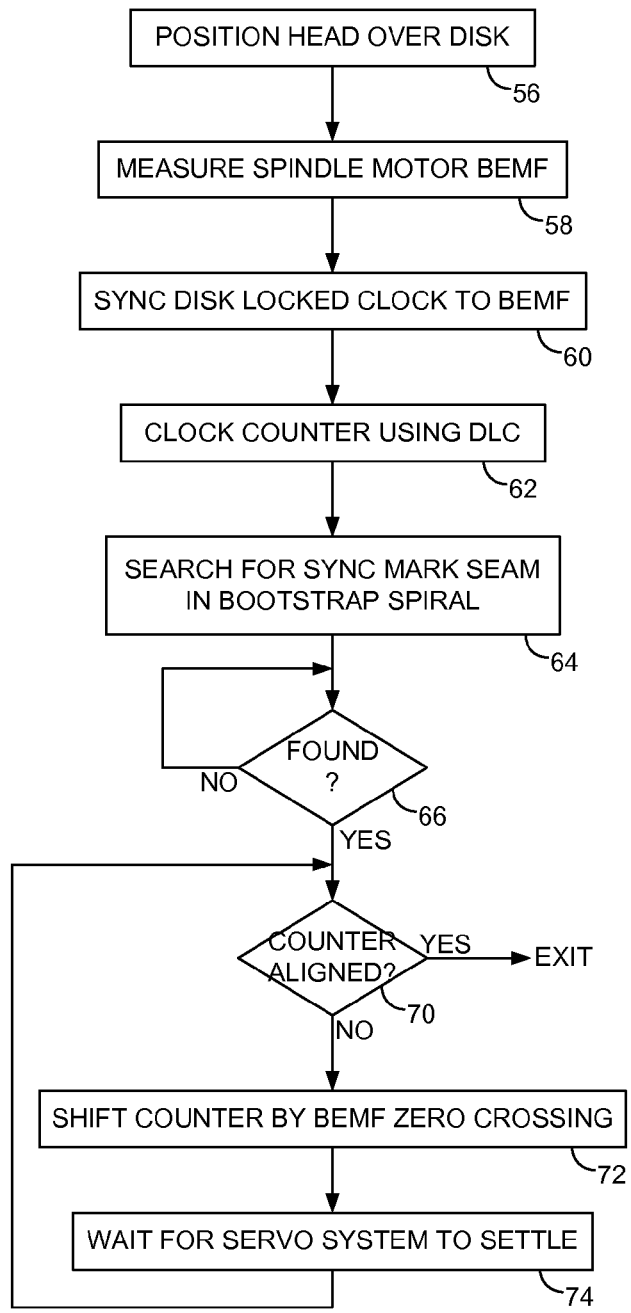
FIG. 10B is a flow diagram according to an embodiment of the present invention wherein the modulo-N counter is initialized by shifting it incrementally (e.g., one spindle BEMF zero crossing) in order to maintain stability of the servo loop.

FIG. 10B shows a flow diagram according to an embodiment of the present invention which extends on the flow diagram of FIG. 10A, wherein the modulo-N counter is adjusted incrementally by a spindle BEMF zero crossing so as to maintain stability in the servo loop. After detecting the sync mark seam (step 66), if the modulo-N counter is not aligned correctly with the following spindle BEMF zero crossing (step 70), the modulo-N counter is shifted by an amount corresponding to a single spindle BEMF zero crossing (step 72). The shift in the modulo-N counter induces a transient in the servo loop similar to a radially shift of the head. Accordingly, the servo system is allowed to settle to account for the transient (step 74). The process is then repeated starting at step 70 until the modulo-N counter wraps at the target spindle BEMF zero crossing. In the example of FIG. 9B, the process is repeated twice in order to shift the modulo-N counter by two spindle BEMF zero crossings so that the modulo-N counter wraps at zero crossing 65.

Any suitable technique may be employed to detect the sync mark seam 46 in the embodiments of the present invention. For example, the sync mark seam 46 may be detected using first and second correlators matched to the first and second sync marks. The sync mark seam 46 may be detected when there is a switch between the output of the correlators. However, noise in the read signal may reduce the accuracy of the correlators leading to a false detection of the sync mark seam 46.

Figure 11A:
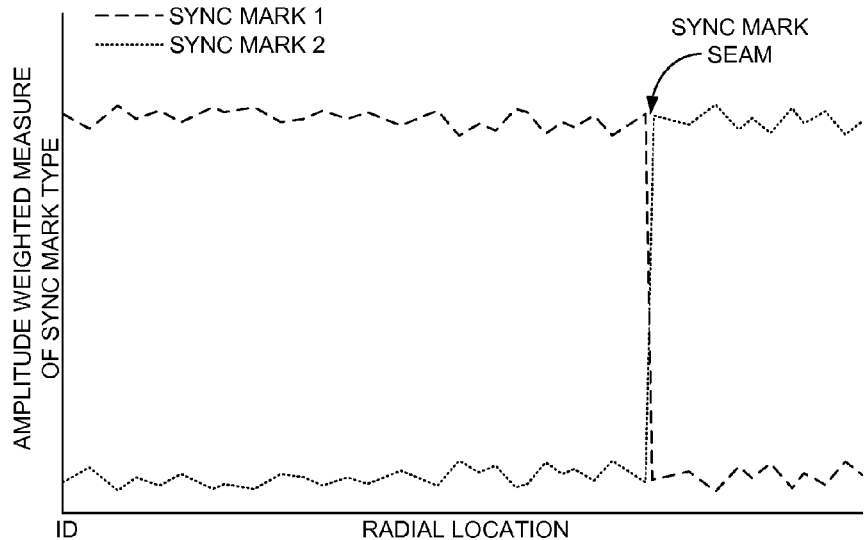
FIG. 11A shows an embodiment of the present invention wherein the sync mark seam in the bootstrap spiral track is detected in response to a first and second weighted measure of the read signal corresponding to the first and second sync marks.
Figure 11B:
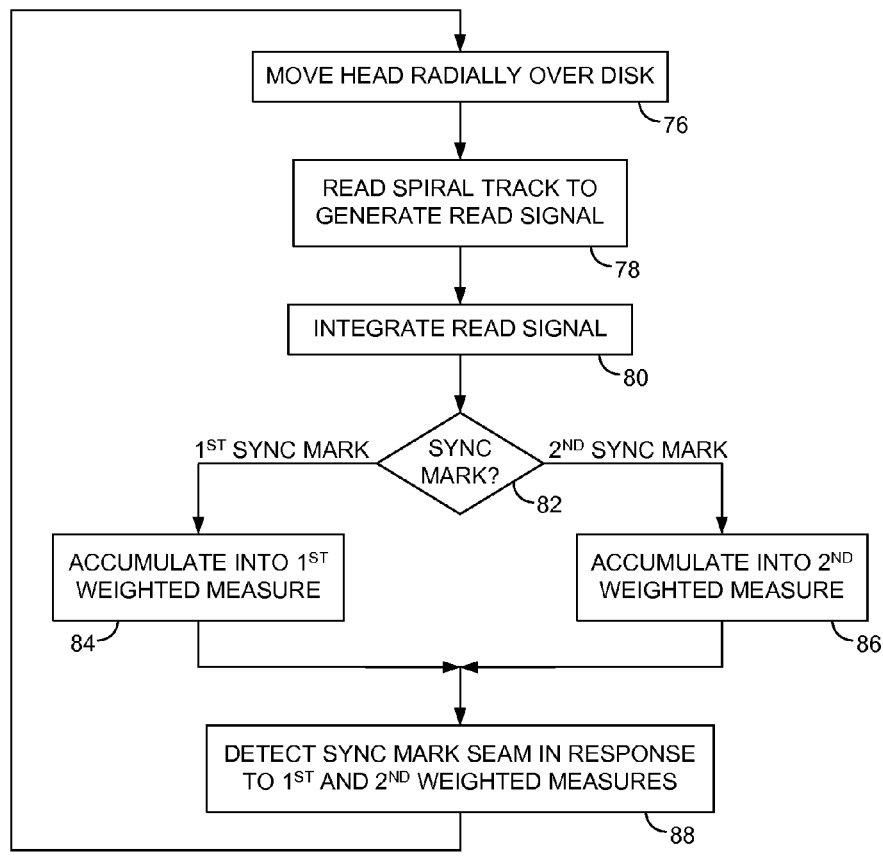
FIG. 11B is a flow diagram according to an embodiment of the present invention wherein the sync mark seam in the bootstrap spiral is detected when the first and second weighted measures switch amplitude.

FIGS. 11A and 11B show an embodiment of the present invention for detecting a sync mark seam in a spiral track more reliably. When searching for the sync mark seam 46 of a spiral track, the control circuitry moves the head radially over the disk (step 76) and reads the spiral track to generate a read signal (step 78). The read signal representing the high frequency signal 22 (FIG. 3B) is integrated (step 80), and when the first sync mark is detected (step 82), the integrated read signal is accumulated into a first weighted measure (step 84). When the second sync mark is detected (step 82), the integrated read signal is accumulated into a second weighted measure (step 86). The sync mark seam in the spiral track is detected in response to the first and second weighted measures (step 88). In one embodiment, the sync mark seam is detected proximate to when an amplitude of the second weighted measure crosses an amplitude of the first weighted measure as illustrated in FIG. 11A. Weighting the sync mark detection relative to the amplitude of the read signal improves the accuracy in detecting the sync mark seam by reducing the significance of the sync marks near the edge of the spiral track crossing where the signal-to-noise ratio is less (FIG. 3B).

Figure 12:
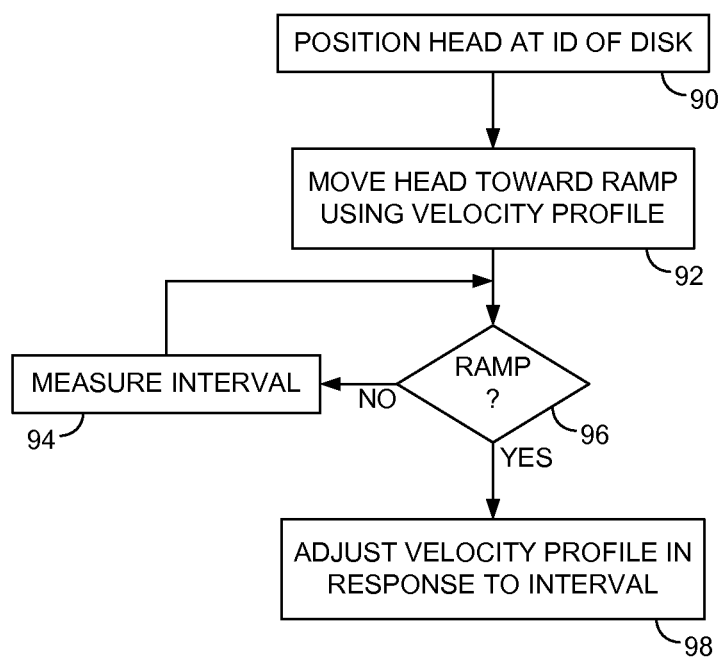
FIG. 12 is a flow diagram according to an embodiment of the present invention for calibrating a velocity profile used to write the bootstrap spiral track.

In one embodiment, the control circuitry calibrates a velocity profile prior to writing the bootstrap spiral track 36 to the disk (FIG. 5B), wherein the velocity profile (e.g., FIG. 8) corresponds to a desired slope for the spiral track across the radius of the disk. FIG. 12 is a flow diagram illustrating an embodiment for calibrating the velocity profile wherein the head is positioned at an inner diameter of the disk (step 90) and then moved toward the ramp in response to the velocity profile (step 92). An interval is measured (step 94) from a beginning of the movement until the head begins unloading onto the ramp 57 of FIG. 5B (step 96). The velocity profile is then adjusted in response to the measured interval (step 98). For example, the velocity profile is adjusted based on the difference between the measured interval and a target interval.

In one embodiment, the interval at step 94 is measured relative to the disk locked clock which represents the rotational phase of the disk. In this embodiment, the target interval corresponds to a target rotational phase of the disk (which may be less or more than one revolution). In one embodiment, the velocity profile is adjusted and the flow diagram of FIG. 12 repeated until the measured interval substantially matches the target interval.

Any suitable velocity profile may be employed in the embodiments of the present invention. FIG. 8 shows an example velocity profile comprising an acceleration segment for accelerating the head away from the inner diameter of the disk, and a constant velocity segment for moving the head at a substantially constant velocity until the head begins unloading onto the ramp. In this embodiment, the constant velocity of the head as it contacts the ramp is consistent with the constant velocity employed when unloading the head onto the ramp during a normal unload operation.

Figure 13:
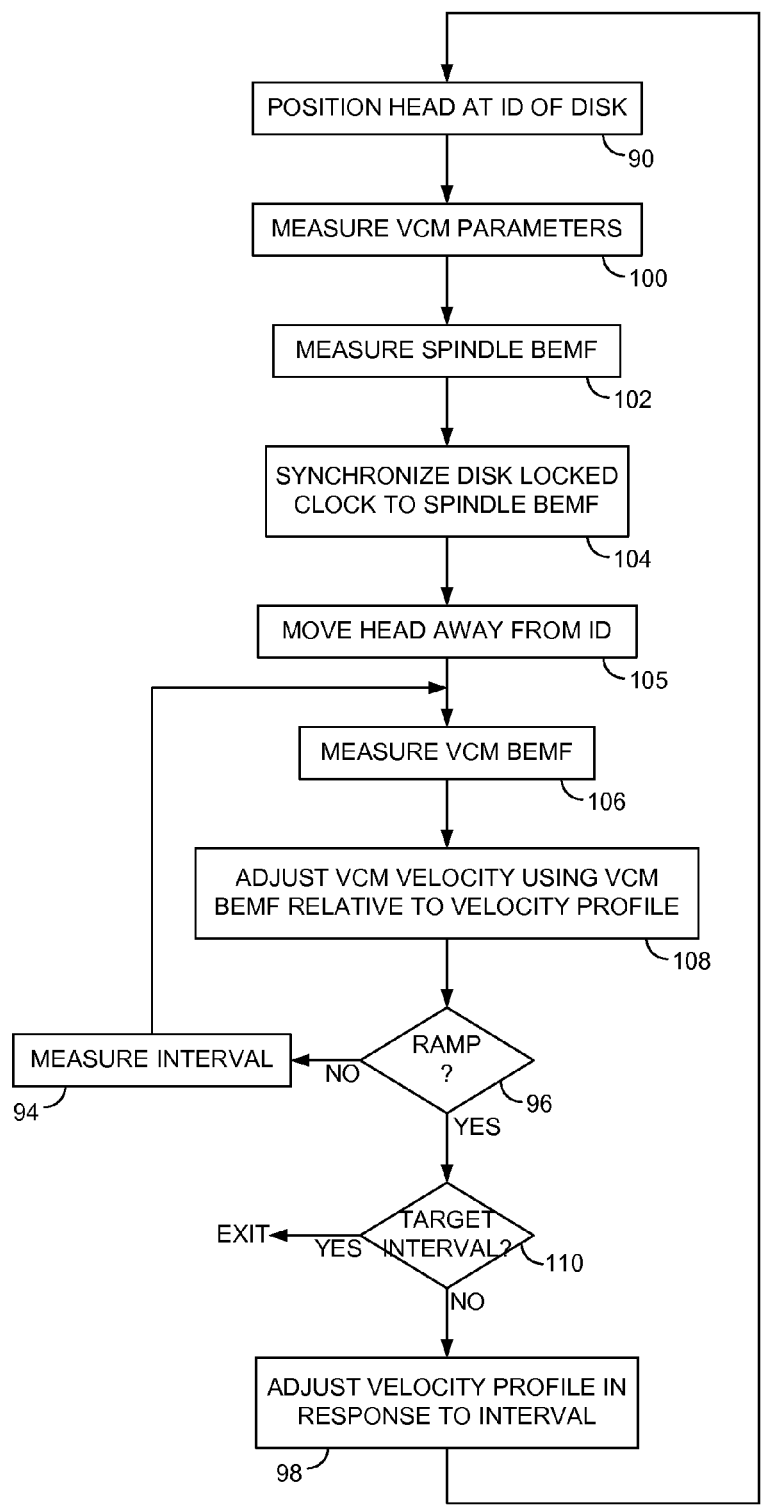
FIG. 13 is a flow diagram according to an embodiment of the present invention wherein when calibrating the velocity profile a voice coil motor (VCM) BEMF voltage is used to seek the head over the disk until the head contacts the ramp.

FIG. 13 is a flow diagram according to an embodiment of the present invention which expands on the flow diagram of FIG. 12, wherein the disk drive in this embodiment comprises a voice coil motor (VCM) 33 for rotating an actuator arm 35 about a pivot (FIG. 5A) in order to move the head radially over the disk. After positioning the head at the inner diameter of the disk (step 90), for example by pressing the actuator arm 35 against an inner diameter crash stop, parameters of the VCM are measured (step 100), such as the resistance and inductance of the voice coil. The spindle motor BEMF voltage is measured (step 102) and the disk locked clock is synchronized to the zero crossings of the spindle BEMF voltage (step 104). The head is moved away from the inner diameter of the disk (step 105) and the VCM BEMF voltage is measured (step 106). The VCM BEMF voltage is evaluated to estimate a velocity of the head (after compensating for the effect of the parameters measured at step 100). The estimated velocity of the head (and optionally other states) are evaluated relative to the velocity profile in order to adjust the velocity of the VCM (step 108). The process is repeated from step 106 until the head contacts the ramp (step 96). If the intervening interval (measured at step 94) does not match a target interval (step 110), the velocity profile is adjusted (step 98) and the flow diagram repeated starting at step 90 until the measured interval substantially matches the target interval (step 110).

Figure 16A:
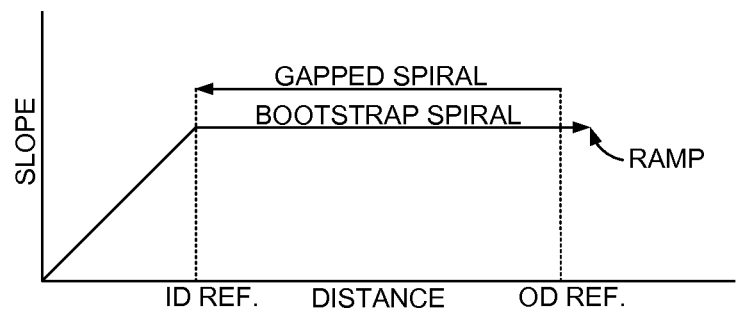
FIGS. 16A and 16B show an embodiment of the present invention wherein the bootstrap spiral track is written at a first slope, and the gapped spiral tracks are written at a second, different slope.

After calibrating the velocity profile, the bootstrap spiral track 36 is written to the disk using the calibrated velocity profile. In an embodiment shown in FIG. 8, when writing the bootstrap spiral track 36 the head is accelerated away from the inner diameter of the disk and then moved at a substantially constant velocity until the head contacts the ramp 57. After the head contacts the ramp, the head is decelerated until it reaches the parked position on the ramp 57. In this manner, the resulting bootstrap spiral track 36 comprises an increasing slope while the head accelerates away from the inner diameter of the disk and a substantially constant slope until the head contacts the ramp as illustrated in FIG. 16A. In one embodiment, the substantially constant slope of the bootstrap spiral track 36 up to the ramp 57 helps maximize the usable area of the disk for writing the product servo sectors by enabling an outer diameter circular reference track to be written very near the outer edge of the disk as described below.

Figure 14A:
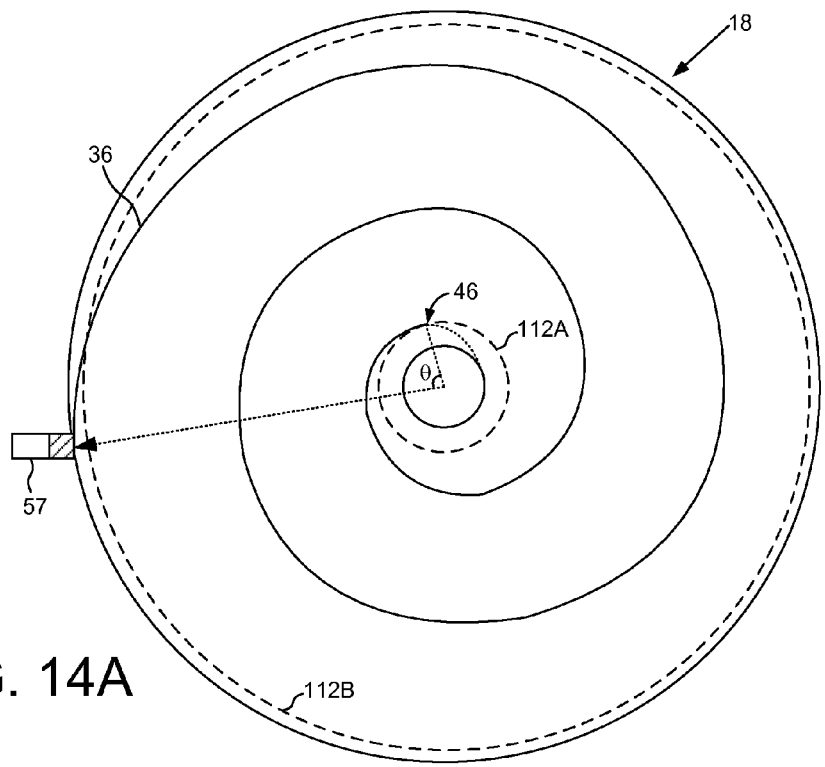
FIG. 14A illustrates an embodiment of the present invention wherein the disk locked clock is used to estimate a radial location of the head relative to a rotational angle of the disk while reading the bootstrap spiral track.

FIG. 14A illustrates an embodiment of the present invention wherein after writing the bootstrap spiral track, the control circuitry servos on the bootstrap spiral track to write at least one circular reference track (e.g., 112A) on the disk 18. A velocity profile is adjusted in response to the circular reference track 112A, and a plurality of spiral tracks are written to the disk in response to the velocity profile. In one embodiment, the velocity profile for writing the spiral tracks using the circular reference track is similar to the velocity profile shown in FIG. 8, except the head is decelerated before reaching the ramp. In one embodiment, the control circuitry seeks the head radially over the disk back and forth in order to write the spiral tracks, wherein the velocity profile is adjusted each time the head crosses over the circular reference track.

Figure 14B:
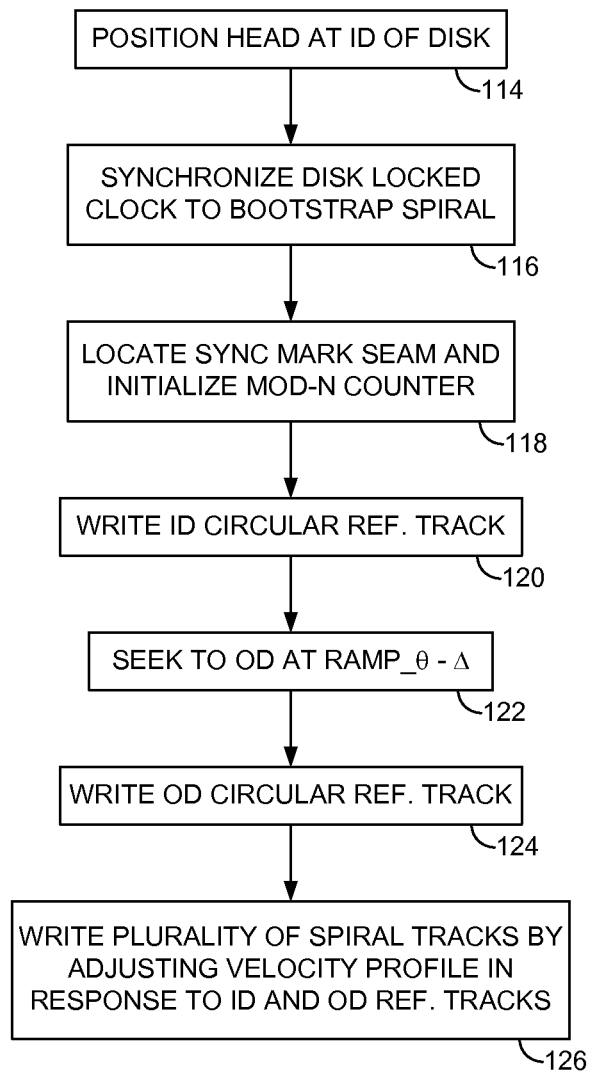
FIG. 14B is a flow diagram according to an embodiment of the present invention wherein ID and OD circular reference tracks are written on the disk by servoing on the bootstrap spiral track.

FIG. 14B is a flow diagram according to the embodiment of the present invention which is understood with reference to FIG. 14A. The control circuitry positions the head at an inner diameter of the disk (step 114), such as by pressing the actuator arm against the inner diameter crash stop. The disk locked clock is then synchronized to the bootstrap spiral track (step 116), wherein in one embodiment the disk locked clock is first synchronized to the zero crossings of the spindle BEMF voltage as described above. The head is then moved radially while searching for the sync mark seam (step 118), and when the sync mark seam is located, the modulo-N counter is initialized as described above.

Once the sync mark seam has been located and the modulo-N counter is initialized, the radial location of the head is known relative to the spiral bootstrap track. At this point, the control circuitry is able to servo the head to any desired radial location by servoing on the bootstrap spiral track relative to the modulo-N counter as described above. In one embodiment, the control circuitry positions the head near the inner diameter of the disk and writes a circular reference track 112A (FIG. 14A) while servoing on the bootstrap spiral track (step 120). In one embodiment, the inner diameter circular reference track 112A is written proximate the sync mark seam 46, which in one embodiment corresponds to the end of the constant velocity segment of the velocity profile used to write the spiral tracks. Accordingly, in this embodiment after writing one of the spiral tracks the inner diameter reference track 112A is read in order to adjust the velocity profile.

Referring again to FIG. 14B, the control circuitry seeks the head to an outer diameter location proximate the ramp (step 122) in order to write an outer diameter circular reference track 112B as shown in FIG. 14A. The control circuitry estimates the radial location of the ramp 57 in FIG. 14A by evaluating the rotational phase of the disk (as determined from the disk locked clock) relative to the spiral bootstrap spiral track 36. That is, when writing the bootstrap spiral track 36 to the disk, the rotational phase of the disk (disk locked clock) is saved when the head contacts the ramp 57. The control circuitry then positions the head at the outer diameter of the disk by servoing the head on the bootstrap spiral track until the rotational phase θ of the disk corresponds to the location of the ramp (minus a back-off delta) as illustrated in FIG. 14A, and then writes the outer diameter circular reference track 112B (step 124). The inner diameter and outer diameter circular reference tracks 112A and 112B are then used to adjust the velocity profile while writing a plurality of spiral tracks to the disk (step 126).

Similar to the inner diameter reference track 112A, in one embodiment the outer diameter reference track 112B is written at the edge of the constant velocity segment of the velocity profile used to write the spiral tracks. As the head crosses over and reads the circular reference tracks at both the inner and outer diameter, the velocity profile is adjusted. For example as described above, the intervening interval between the reference tracks during each seek is measured, compared to a target interval, and the difference used to adjust the velocity profile.

Figure 15A:
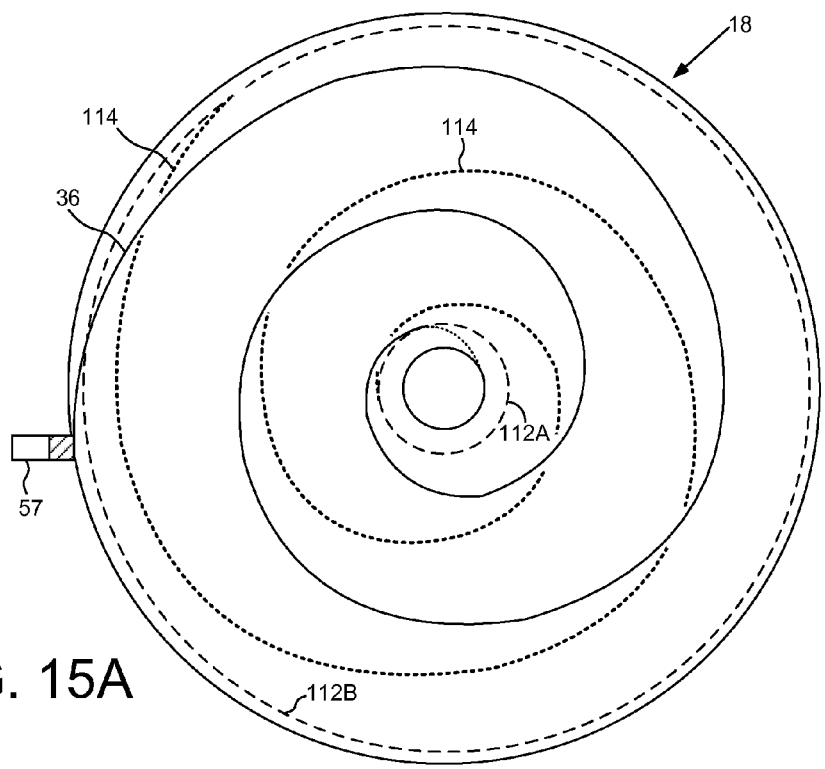
FIG. 15A shows an embodiment of the present invention wherein a gapped spiral track is written while moving the head in a radial direction opposite of that used to write the bootstrap spiral track.

FIG. 15A shows an embodiment of the present invention for writing the plurality of spiral tracks while adjusting the velocity profile in response to the circular reference tracks. In this embodiment, the bootstrap spiral track 36 is also used to adjust the velocity profile by measuring an interval between spiral track crossings, comparing the interval to a target interval, and adjusting the velocity profile in response to the difference. Accordingly in this embodiment, the writing of each spiral track is paused in order to read the bootstrap spiral track as the head approaches an expected spiral track crossing, and therefore the spiral tracks are written with gaps to allow the head to read the bootstrap spiral track.

Referring again to FIG. 15A, the control circuitry positions the head at a first radial location (inner diameter in this example), and moves the head from the first radial location toward a second radial location (outer diameter) while writing the bootstrap spiral track 36 to the disk 18. The head is then positioned near the second radial location (outer diameter), and moved from the second radial location toward the first radial location (inner diameter) while writing a gapped spiral track 114 to the disk 18. Accordingly in this embodiment, the gapped spiral track 114 is written in the opposite radial direction that the bootstrap spiral track 36 is written. Writing the gapped spiral track 114 in the opposite direction increases the number of bootstrap spiral crossings and therefore the number of samples used to adjust the velocity profile.

Figure 15B:
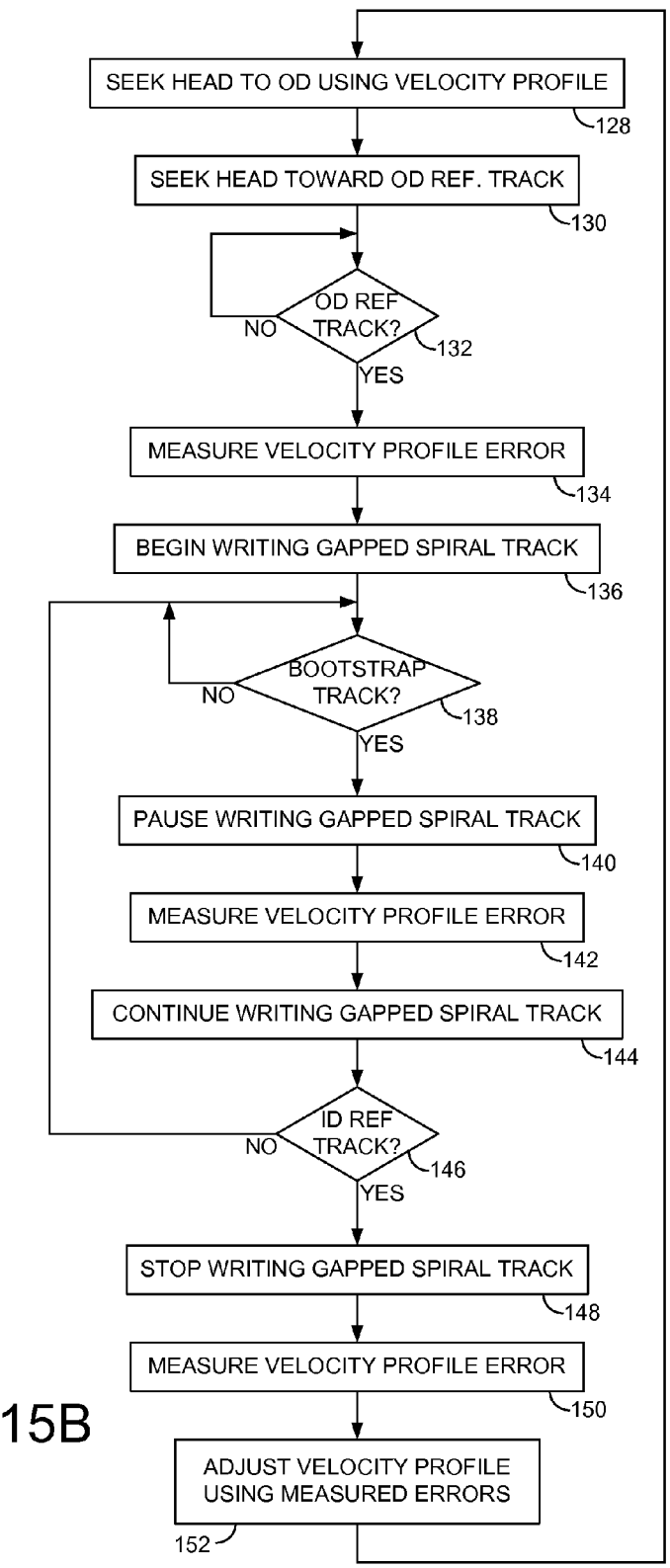
FIG. 15B is a flow diagram according to an embodiment of the present invention wherein the velocity profile is adjusted in response to reading the ID and OD circular reference tracks as well as the bootstrap spiral track.

FIG. 15B is a flow diagram according to a more detailed embodiment of the present invention, wherein the control circuitry seeks the head to the outer diameter of the disk using the velocity profile (step 128), and then begins a new seek operation in the opposite direction toward the outer diameter circular reference track (step 130). When the outer diameter circular reference track is detected (step 132) a velocity profile error is measured (step 134). The control circuitry then begins writing a gapped spiral track to the disk (step 136) while seeking the head radially over the disk at the substantially constant velocity of the velocity profile. When the head approaches the bootstrap spiral track 36 as shown in FIG. 15A (step 138), the writing of the gapped spiral track is paused (step 140) in order to read the bootstrap spiral track and measure a corresponding velocity profile error (step 142). The gapped spiral track continues to be written across the radius of the disk (step 144) while periodically pausing to read the bootstrap spiral track and generate another velocity profile error. When the head reaches the inner diameter circular reference track (step 146), the control circuitry stops writing the gapped spiral track (step 148), and reads the inner diameter reference track in order to measure a velocity profile error (step 150). The control circuitry then adjusts the velocity profile using the measured velocity profile errors (step 152) prior to repeating the flow diagram (starting at step 128) in order to write another gapped spiral track.

Figure 16B:
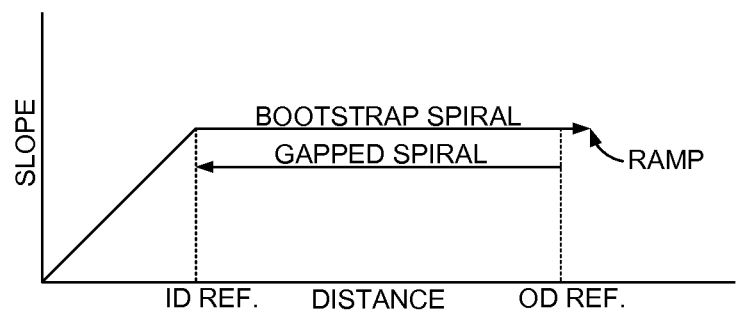

In one embodiment, the control circuitry writes the bootstrap spiral track 36 having a first substantially constant slope, and writes the gapped spiral tracks having a second substantially constant slope different than the first substantially constant slope. This is illustrated in FIG. 16A wherein the slope of the gapped spiral tracks is greater than the slope of the bootstrap spiral track, or in an alternative embodiment shown in FIG. 16B, the slope of the gapped spiral tracks may be less than the slope of the bootstrap spiral track. FIGS. 16A and 16B also illustrate an embodiment wherein the bootstrap spiral track is written with a substantially constant slope until the head contacts the ramp, whereas the gapped spiral tracks are written with a substantially constant slope until the head reaches the inner diameter circular reference track. Also in the embodiment of FIGS. 16A and 16B the gapped spiral tracks begin when the head reaches the constant velocity segment of the velocity profile (e.g., when the head reaches the outer diameter circular reference track).

In one embodiment, after writing one of the gapped spiral tracks from the outer diameter to the inner diameter, the control circuitry seeks the head back to the outer diameter of the disk (step 128 of FIG. 15B) using the same velocity profile used to write the gapped spiral tracks. Since the velocity profile for writing the gapped spiral tracks is different than that used to write the bootstrap spiral track, the head will cross the bootstrap spiral track while seeking back to the outer diameter of the disk. In one embodiment, each time the head crosses the bootstrap spiral track while seeking back to the outer diameter of the disk, a velocity profile error is measured and used to adjust the velocity profile for writing the gapped spiral tracks.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;

a head actuated over the disk; and control circuitry operable to:
- control the head to write a bootstrap spiral track on the disk;
- servo on the bootstrap spiral track to control the head to write at least one circular reference track on the disk;
- adjust a velocity profile in response to the circular reference track; and
- control the head to write a plurality of spiral tracks to the disk in response to the adjusted velocity profile.

2. The disk drive as recited in claim 1, wherein the control circuitry is further operable to:
- write a first circular reference track near an inner diameter of the disk; and
- write a second circular reference track near an outer diameter of the disk.

3. The disk drive as recited in claim 1, wherein the control circuitry is further operable to:
- seek the head radially over the disk relative to the velocity profile;
- read the circular reference track and measure a velocity profile error; and
- adjust the velocity profile in response to the velocity profile error.

4. A disk drive comprising:
- a disk;
- a head actuated over the disk; and
- control circuitry operable to:
  - position the head at a first radial location;
  - move the head from the first radial location toward a second radial location while writing a bootstrap spiral track to the disk;
  - position the head near the second radial location; and
  - move the head from the second radial location toward the first radial location while writing a first gapped spiral track to the disk.

5. The disk drive as recited in claim 4, wherein the first radial location is near an inner diameter of the disk and the second radial location is near an outer diameter of the disk.

6. The disk drive as recited in claim 4, wherein the control circuitry is further operable to:
- pause the writing of the first gapped spiral track in order to read the bootstrap spiral track;
- measure a velocity profile error in response to reading the bootstrap spiral track;
- adjust a velocity profile in response to the velocity profile error; and
- write a second gapped spiral track to the disk relative to the adjusted velocity profile.

7. The disk drive as recited in claim 6, wherein the control circuitry is further operable to write the second gapped spiral track toward the first radial location.

8. The disk drive as recited in claim 4, wherein the control circuitry is further operable to:
- write the bootstrap spiral track having a first substantially constant slope; and
- write the first gapped spiral track having a second substantially constant slope different than the first substantially constant slope.

9. A method of operating a disk drive, the disk drive comprising a head actuated over a disk, the method comprising:
- writing a bootstrap spiral track on the disk;
- servoing on the bootstrap spiral track to write at least one circular reference track on the disk; and
- adjusting a velocity profile in response to the circular reference track; and
- writing a plurality of spiral tracks to the disk in response to the adjusted velocity profile.

10. The method as recited in claim 9, further comprising:
- writing a first circular reference track near an inner diameter of the disk; and
- writing a second circular reference track near an outer diameter of the disk.

11. The method as recited in claim 9, further comprising:
- seeking the head radially over the disk relative to the velocity profile;
- reading the circular reference track and measure a velocity profile error; and
- adjusting the velocity profile in response to the velocity profile error.

12. A method of operating a disk drive, the disk drive comprising a head actuated over a disk, the method comprising:
- positioning the head at a first radial location;
- moving the head from the first radial location toward a second radial location while writing a bootstrap spiral track to the disk;
- positioning the head near the second radial location; and
- moving the head from the second radial location toward the first radial location while writing a first gapped spiral track to the disk.

13. The method as recited in claim 12, wherein the first radial location is near an inner diameter of the disk and the second radial location is near an outer diameter of the disk.

14. The method as recited in claim 12, further comprising:
- pausing the writing of the first gapped spiral track in order to read the bootstrap spiral track;
- measuring a velocity profile error in response to reading the bootstrap spiral track;
- adjusting a velocity profile in response to the velocity profile error; and
- writing a second gapped spiral track to the disk relative to the adjusted velocity profile.

15. The method as recited in claim 14, further comprising writing the second gapped spiral track toward the first radial location.

16. The method as recited in claim 12, further comprising:
- writing the bootstrap spiral track having a first substantially constant slope; and
- writing the first gapped spiral track having a second substantially constant slope different than the first substantially constant slope.

\* \* \* \* \*